INVENTORS
BERNARD M. GORDON
ROBERT P. TALAMBIRAS
BY Joseph Weingarten
ATTORNEY

DATA SIGNAL PROCESSING APPARATUS

Filed Nov. 3, 1958

INVENTORS
BERNARD M. GORDON
ROBERT P. TALAMBIRAS
BY Joseph Weingarten
ATTORNEY

INVENTORS
BERNARD M. GORDON
ROBERT P. TALAMBIRAS
BY
Joseph Weingarten
ATTORNEY

United States Patent Office 3,105,231
Patented Sept. 24, 1963

3,105,231

DATA SIGNAL PROCESSING APPARATUS

Bernard M. Gordon, Newton, and Robert P. Talambiras, Boston, Mass., assignors to Epsco Incorporated, Boston, Mass., a corporation of Massachusetts Filed Nov. 3, 1958, Ser. No. 771,664
7 Claims. (Cl. 340—347)

The present invention relates in general to data processing and more particularly concerns novel apparatus for converting a number of input analog signals into digital form with great accuracy in a relatively short time. This is accomplished without multiplexing and utilizes circuitry in which the number of critical parameters is minimized.

When making tests of complex systems, it is frequently necessary to continuously monitor data signals from a number of sources. Typically these signals are provided by strain guages and thermocouples located at various points within and near the system under test. In order to evaluate the system, data processing machines are often employed to process the monitored data. A high degree of accuracy is more readily obtained if digital data processing systems operate upon this data. Since the data signals are generally in analog form, the monitored data signals must first be converted into digital form. If the full accuracy of the digital data processing system is to be realized, the conversion into digital form must be effected with great accuracy. Since accurate analog to digital converters are costly, it is common practice to use multiplexing techniques to connect the different signals in sequence to a single converter.

However, the multiplexing system itself is often a source of error. Multiplexing systems in which this error is minimized to a tolerable level are generally costly and introduce additional components subject to failure.

Accordingly, the present invention contemplates and has as a primary object the accurate conversion of a number of input analog signals into digital form.

It is another object of the invention to achieve the preceding object without multiplexing and with apparatus which functions with great reliability.

It is still another object of the invention to provide a relatively large number of conversions per unit time interval.

Another object of the invention is to provide means for storing each conversion in a location corresponding to the analog signal which it represents.

A further object of the invention is to further store a frame number with conversions corresponding to the level of the input signals at a particular time to identify the order in which the stored digital numbers must be reassembled to correctly represent the input analog signals.

Still another object of the invention is to hold the levels of the input analog signals to respective values which occur at the same time and convert the levels thus held into digital numbers.

According to the invention, means are provided for developing a decoded analog signal which changes amplitude by stepwise increments corresponding to changes in value of a digital number. The decoded analog signal is compared with each of the input analog signals to provide a compare signal identifying the one or more input analog signals then differing from the decoded analog signal by a predetermined amount. The value of the digital number at this time is then transferred into those portions of a storage system asociated with the one or more analog signals thus identified. The decoded analog signal is stepped through a range sufficient to cause each input analog signal to be converted into a corresponding digital number. Then, the stored numbers may be transferred to an external circuit.

Other features, objects and advantages of the invention will become apparent from the following specification when read in connection with the accompanying drawing in which.

Figure 1:
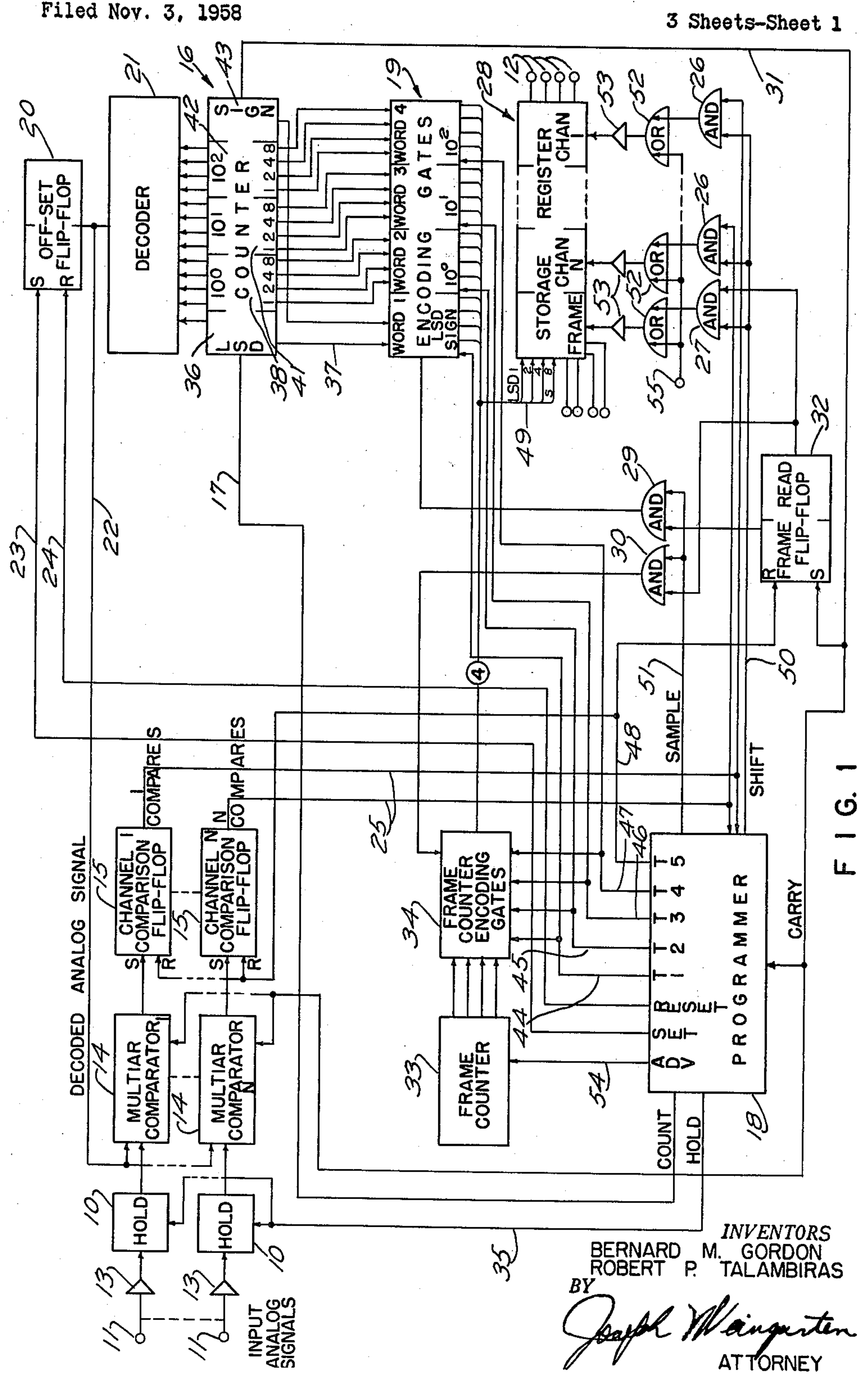
FIG. 1 is a block diagram illustrating the logical arrangement of a preferred embodiment of the invention.

With reference now to the drawing and more particularly FIG. 1 thereof, there is illustrated a block diagram showing the logical arrangement of a preferred embodiment of the novel system. The input analog signals applied on respective input terminals 11 are encoded into a sequence of decimal digits each represented by four binary bits provided in parallel on the four output terminals 12. Before discussing in detail the mode of operation, the physical arrangement and logic of the system will be described. For each input analog signal, there is a separate channel. Each channel includes a chopper stabilized amplifier 13, a hold circuit 10, a multiar comparator 14 and a channel comparison flip-flop 15. A counter 16 is advanced by count pulses supplied on line 17 from programmer 18.

A decoder 21 responds to the count representing a digital number in counter 16 by providing a decoded analog signal representative of the count on line 22. An off-set flip-flop 20 is set and reset at appropriate times, by signals on lines 23 and 24, respectively, from programmer 18. When set this flip-flop provides a potential for off-setting the decoded analog signal for reasons explained below.

The decoded analog signal is applied jointly to the inputs of the comparators 14. Each comparator is energized respectively from a hold circuit 10 which samples the amplified input analog signal from an associated amplifier 13 and holds the value thereof at the time a Hold signal is delivered on line 35. When the difference between the decoded analog signal and the respective input analog signal is less than a predetermined magnitude, a comparator 14 delivers a signal to the associated channel comparison flip-flop 15 which sets the flip-flop to cause a compare signal conditioning potential to be delivered on the associated output line 25. When any one or more of lines 25 is conditioned, an associated AND gate 26 is enabled and programmer 18 responds by delivering suitable control pulses for transferring the count then in counter 16 through encoding gates 19 into storage register 28.

During each cycle of operation, the counter 16 is stepped by increments corresponding to single changes in the least significant digit of a digital number represented by its state. These changes occur between the greatest and least values of the digital number over a range sufficient to digitalize all input signal amplitudes. In the exemplary embodiment of this invention, the digital number represented has three decimal digits and the least significant digit is binary, corresponding to a decimal value of 0 or 0.5. In addition, an indication of the sign of the digital number may be represented as a binary digit in the counter so that the digital number represented by the counter assumes the range of values in steps of 0.5 between +999.5 to −999.5. At the completion of a cycle, counter 16 delivers a carry pulse on line 31 which sets the frame read flip-flop 32. When flip-flop 32 is set, the number in digital form stored in frame counter 33 may be transferred through frame count encoding gates 34 into an appropriate position in storage register 28 to identify the set of digital numbers then stored. This transfer is initiated by the programmer in response to the carry pulse.

In a preferred form of operation, each hold circuit 10 includes a capacitor or other suitable storage device for holding the level of the associated input analog signal to that which occurred at the time hold line 35 is conditioned by programmer 18. During each cycle of the counter 16, each of the levels thus held is converted into a digital number which is stored in an associated portion of storage register 28 when a gate 26 is conditioned by an associated channel comparison flip-flop 15. If two or more channel levels are the same, the digital numbers characteristic thereof will be transferred into appropriate portions of storage register 28 at the same time.

The foregoing brief description should facilitate an understanding of the detailed description of the mode of operation which follows.

It is convenient to initially assume that count pulses delivered from programmer 18 are stepping the count in counter 16. The decoded analog signal on line 22 is then changing by stepwise increments having a magnitude equal to the analog equivalent of the least significant digit stored in counter 16. For this specific example, this increment corresponds to decimal 0.5. When the difference between the decoded analog signal on line 22 and an input analog signal delivered by an amplifier 13 is less than the magnitude of this increment, a comparator 14 delivers an output signal which sets flip-flop 15. When a flip-flop is set, an output line 25 is conditioned and associated gates 26 are enabled while programmer 18 is activated to provide control signals for transferring the digital number electrically represented by the state of counter 16 through encoding gates 19 into portions of storage register 28 associated with the enabled ones of gates 26.

When a line 25 is conditioned, programmer 18 provides a set signal on line 23 for setting offset flip-flop 20 and temporarily refrains from delivering count pulses on line 17 to counter 16. The count in counter 16 then remains temporarily unchanged or frozen. At the same time, the offset potential developed by flip-flop 20 effectively disconnects the decoded analog signal from the inputs of the comparators 14 to prevent a false comparison from being indicated as a result of transients developed during the period in which a digital number is transferred into storage.

Before continuing with the explanation of how the temporarily unchanged digital number represented by the state of counter 16 is transferred into storage, it is appropriate to consider generally the nature of counter 16. In this exemplary embodiment, this counter consists of five cascaded stages. The first stage 36 is a binary counter which changes its state in response to each count pulse delivered on line 17 to deliver a signal on line 37 indicative of the least significant digit. The second stage 38 is a conventional four-stage decode scaler which changes its state once for every two count pulses delivered on line 17. Four output lines deliver potentials representative of the value of the units digit. Various codes may be used to designate this value. It has been found satisfactory to use the 8-4-2-1 excess three system of representing the decimal digit. In this system of representation, the four output lines are weighted as 1, 2, 4, and 8, respectively, and three less than the sum of the weightings of the conditioned lines indicates the value of the decimal digit then represented by the state of the decade scaler. The third and fourth stages 41 and 42, respectively, are also decade scalers. The last stage 43 is a binary stage whose state is characteristic of the sign of the digital number having the magnitude represented by the state of the preceding stages.

A counter digitalizing cycle begins with the state of counter 16 representing a digital number +999.5. Each count pulse delivered on line 17 is effective in stepping the count of counter 16 down by 0.5. Thus, after the delivery of 1,999 pulses on line 17, the digital number represented is +000.0 and the next pulse resets all three decimal stages to 9 and the least significant digit to .5 while delivering a carry pulse to stage 43 to change its state, thereby indicating a minus sign. After 1,999 additional pulses are delivered on line 17, the digital number represented by the counter is −000.0. The 4,000th pulse delivered on line 17 clears the counter back to +999.5, completing a cycle. The decoded analog signal from decoder 21 developed is stepped linearly from a value of +50 volts to −50 volts for comparison with the staticized and sampled voltage held by each hold circuit 10 as described previously.

Because of the nature of the number progression, those numbers which are preceded by a minus sign are the complement of the digital number then represented by the decoded analog signal. In some digital computers, negative numbers are complemented while positive numbers are not so that all the numbers represented in this form may be used directly. However, if the digital numbers are to be utilized in terms of actual magnitude and sign, any well-known technique of complementing may be used to change the negative number into the desired form.

Having discussed the nature of the digital numbers, it is appropriate to resume the consideration of how the numbers are transferred into storage. Each digital number is represented by four words composed of no more than four binary bits. The first word includes the least significant digit and sign in the first and fourth bits, respectively, the second and third bits being unused. The second, third, and fourth words represent the units, tens, and hundredths digits, respectively, of the digital number. In each word, the first, second, third and fourth bits correspond to counter lines weighted 1, 2, 4, and 8, respectively. The storage register 28 consists of four shift registers arranged whereby a column including a core from each register stores the four bits of a word. A portion of the storage register comprising five consecutive columns is used to accept a block of four words. The first column of each group of five accepts all words being inserted into storage regardless of whether the word is addressed to that group or not. Words addressed to a group are shifted in sequence from the first column to the remaining four.

The four words are transferred into storage in response to timing pulses T1, T2, T3, T4 and T5 delivered in that order on lines 44, 45, 46, 47 and 48 respectively, and shift pulses delivered on line 50 through enabled ones of gates 26 and 27 and buffers 52 to shift pulse amplifiers 53 and then to the shift windings of those cores in the associated group.

The block 19 of encoding gates is represented as divided into four sections. Each of the sections correspond to one of the words to be inserted into storage and the four encoding output lines from each form a part of cable 49. All portions of the encoding gates are energized by the core input sample pulse delivered on line 51. However, these portions are respectively energized by timing pulses T1, T2, T3 and T4 which occur in that sequence. The output lines from an encoding gate portion will be activated only if a core input sample pulse occurs concurrently with a timing pulse; therefore, the lines in cable 49 are activated in sequence with signals characteristic of the four bits in words 1–4. Before each timing pulse, a shift pulse is provided on line 50. These shift pulses are passed by only the enabled ones of gates 26 and 27. During the course of a transfer cycle, one or more of the gates 26 will be enabled and the associated portion of the storage register 28 energized with shift pulses so that each word is shifted into the following column in the selected group until words 1, 2, 3, and 4 are stored in columns 5, 4, 3, and 2, respectively. Then, timing pulse T5 is generated, resetting all the channel comparison flip-flops 15 and the offset flip-flop 23 and count pulses are again delivered on line 17 until the next compare signal is provided. The sequence of events described above is then repeated.

After counter 16 has cycled through all values, each of the previously held levels of the input signals has been converted into a digital number which is stored in the appropriate portion of storage register 28 and a carry pulse is delivered on line 31 to set frame read flip-flop 32 and thereby disable gate 29 while enabling gate 30 so that the sample pulse on line 51 is applied to the frame count encoding gates 34. The carry pulse also resets each multiar comparator.

Frame counter 33 consists of four cascaded decade scalers and its state is representative of a four digit decimal number. In a manner similar to that described above with respect to counter 16 and gates 27, output potentials from frame counter 33 are transferred to the frame portion of storage register 28 through frame count encoding gates 34 and cable 49. The count in frame counter 33 is then advanced by one in response to an advance pulse delivered on line 54 from programmer 18. Count pulses are again temporarily not delivered on line 17 and the hold potential on line 35 is removed so that the storage elements in each hold circuit 10 may assume levels consistent with the values of the respective input analog signals at this time prior to initiation of another digitalizing cycle.

Figures 2, 4:
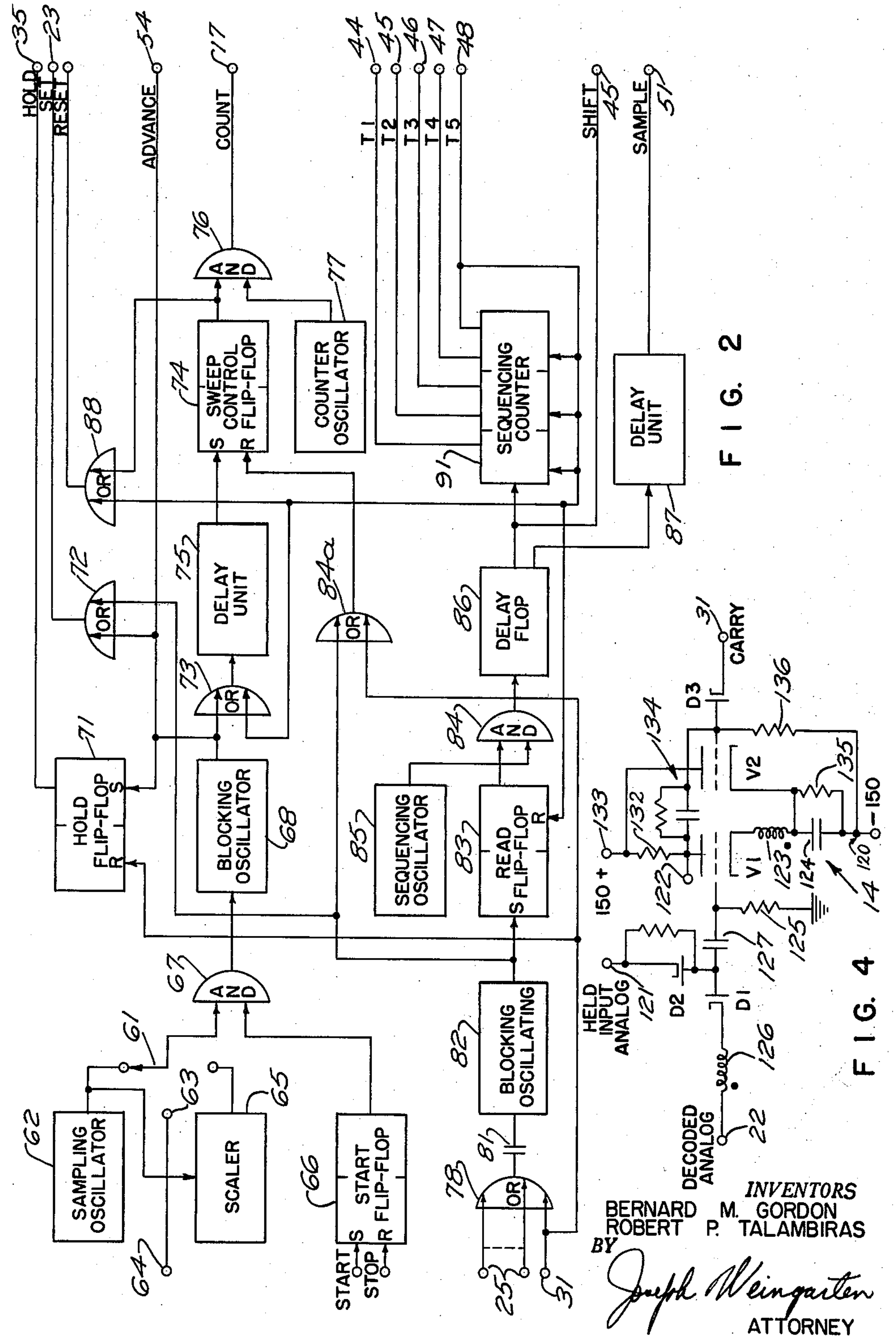
FIG. 2 shows a block diagram of the programmer represented as a single block in FIG. 1.
FIG. 4 is a schematic circuit diagram of a preferred embodiment of a multiar comparator.

Having described the overall system, it is appropriate to consider certain portions thereof in greater detail. Referring to FIG. 2, there is shown in block diagram form the logical arrangement of programmer 18. The output terminals on the right bear the same reference numeral as corresponding lines emanating from programmer 18 in FIG. 1. A switch 61 is used to select signals which determine how often counter 16 is cycled. When connected to sampling oscillator 62 as shown, the number of pulses per unit time from oscillator 62 determines the rate of conversion. Typically, sampling oscillator 62 provides 10 pulses per second so that each of the N channels is sampled ten times per second.

When connected to terminal 63, external sampling pulses applied to terminal 64 determine the sampling rate.

When switch 61 is connected to scaler 65 energized by the output of sampling oscillator 62, the sampling rate of the latter is effectively reduced. Typically, this reduction is by a factor of ten so that each input analog signal is sampled once per second.

A start signal applied to the set input of start flip-flop 66 conditions gate 67 to pass the sampling pulses delivered by switch 61, thereby triggering blocking oscillator 68. Blocking oscillator 68 responds by providing an output pulse which sets hold flip-flop 71. This output pulse is also passed through buffer 72 as the set signal delivered by terminal 23 for setting offset flip-flop 20.

In addition, this pulse is utilized as an advance pulse on terminal 54 for advancing the count of frame counter 33.

The output pulse from blocking oscillator 68 is also passed through buffer 73 to set sweep control flip-flop 74 after being delayed by delay unit 75 for a time interval sufficient to allow offset flip-flop 20 to stabilize after being reset.

When sweep control flip-flop 74 is set, it conditions gate 76 to pass count pulses from counter oscillator 77 to count terminal 17. A typical pulse rate from counter oscillator 77 is 125 kilocycles.

When one of the compare terminals 25 is conditioned, the change in potential is differentiated by capacitor 81 to provide a pulse for triggering blocking oscillator 82. The output pulse from blocking oscillator 82 is transmitted through buffer 72 to set terminal 23 for setting offset flip-flop 20. Also, this pulse is coupled through buffer 84*a* to the reset input of sweep control flip-flop 74.

This resets flip-flop 74, thereby disabling gate 76 so that counter oscillator 77 no longer delivers count pulses to terminal 17.

The output pulse from blocking oscillator 82 is effective in initiating a read sequence by which a digital number is transferred into storage register 28.

This output pulse sets read flip-flop 83 to condition gate 84. When gate 84 is conditioned, it delivers pulses from sequencing oscillator 85 to a delay flop 86. The delay flop 86 furnishes enough delay so that transients due to the sequence of events which occur upon the occurrence of a compare signal have died out. The delayed sequencing pulses from delay flop 86 are delivered to terminal 45 and utilized as shift pulses. The delayed pulses from a second output of delay flop 86 are applied to a delay unit 87 which provides sample pulses on terminal 51.

The delayed sequencing pulses from delay flop 86 are also applied to sequencing counter 91 which responds by providing five timing pulses in sequence on terminals 44—48. Sequencing counter 91 may be embodied in many forms. For example, it might be a conventional three stage binary counter reset to a count of 010 upon termination of the T5 timing pulse on terminal 48. The T5 timing pulse is also applied to the reset input of read flip-flop 83. This disables gate 84 and sequencing oscillator 85 no longer delivers sequencing pulses, thereby terminating the read operation. The T5 timing pulses are also applied to the input of buffer 88 to reset the offset flip-flop 20 and through buffer 73 and delay unit 75, to the set input of sweep control flip-flop 74, thereby enabling gate 76 to pass count pulses from counter oscillator 77 to terminal 17 whereby the count in counter 16 is again stepped until the next compare signal is provided.

Upon completion of a digitalizing cycle, a carry pulse applied to terminal 31 is passed by buffer 78 to initiate the sequence of events just described in connection with transferring the count in the counter 16 into storage. However, since the carry pulse also sets frame read flip-flop 32 (FIG. 1), the count transferred is from frame counter 33 instead. The carry pulse is also applied to buffer 84*a* to provide a pulse for resetting the sweep control flip-flop 74.

The carry pulse also resets hold flip-flop 71, causing the hold potential to be removed from terminal 35. This allows each hold circuit 10 to sample the analog signal output from the associated amplifier 13.

Figure 3:
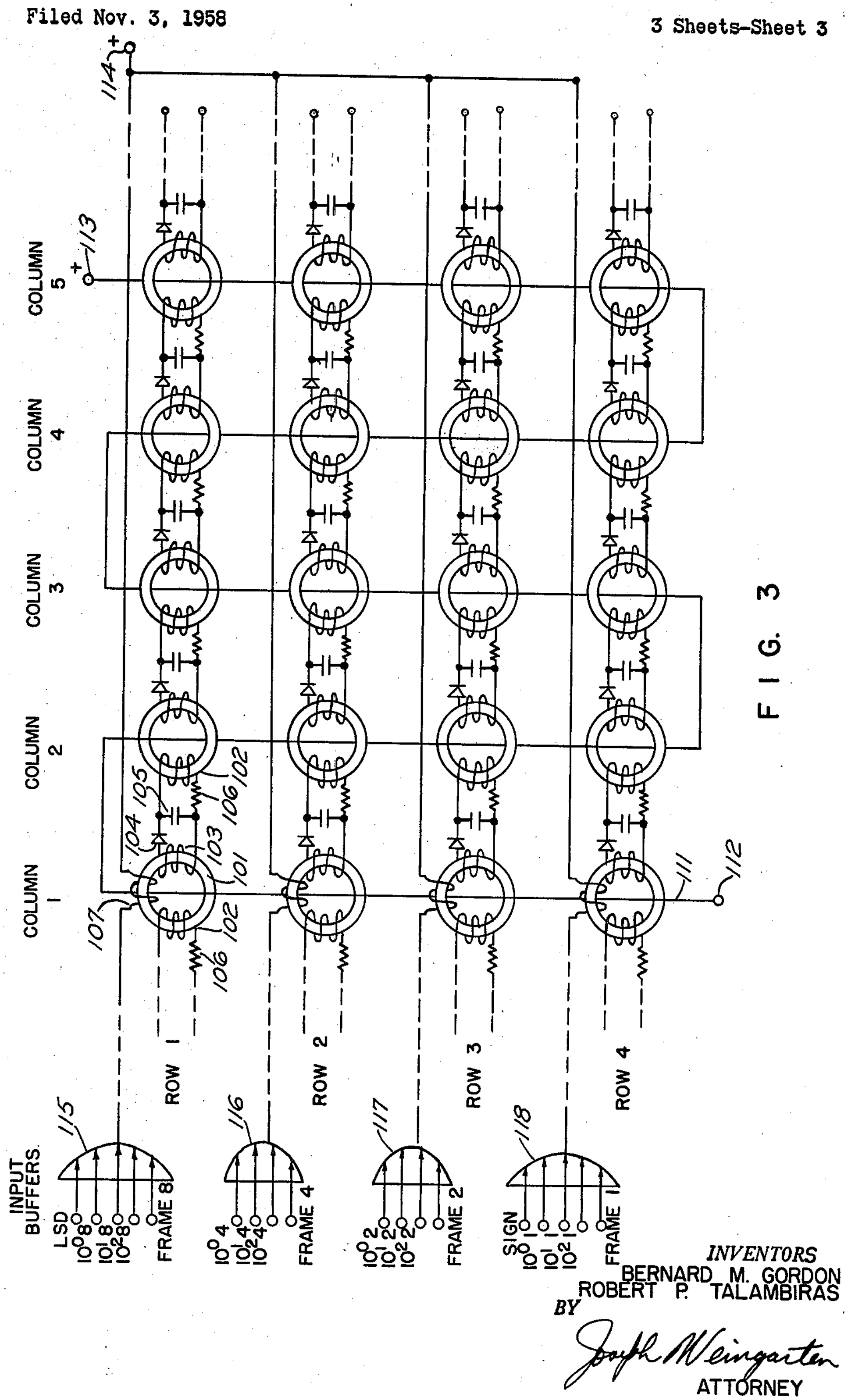
FIG. 3 is a schematic representation of a shift register for temporarily storing the digital number from a sampled channel.

Referring to FIG. 3, there is shown a schematic circuit diagram of a portion of storage register 28 arranged to accept and store the digital number associated with a channel or the frame together with the input buffers. The storage register consists essentially of four conventional magnetic core shift registers. Each core 101 has an input winding 102 and an output winding 103. Positive pulses from the output winding 103 of one core are coupled to the input winding 102 of the following core by a diode 104 and a delay network formed of capacitor 105 and a resistor 106. The cores in column 1 also include a data input winding 107 which accepts the data words transmitted over cable 48. A shift line 111 is connected between terminal 112 and a source of positive potential applied to terminal 113. This line is threaded through each core in the portion so that when it carries current in response to a shift pulse, all the cores in that portion are then reset to the Zero state. Upon termination of such a shift pulse, data is transferred to the right. Terminal 112 is connected to the output of a respective amplifier 47 shown in FIG. 1. Since the core stages are alike, reference numerals are applied only to the core and associated circuitry in row 1, column 1.

All the data input windings 107 in a particular row are connected in series between an input buffer and a source of positive potential on terminal 114.

The data input windings of row 1 receive signals from a five-line buffer 115. From the labeled input terminals, it is seen that this buffer accepts signals representative of the least significant digit and the most heavily weighted binary bit of the different decimal digits.

The data input windings of rows 2 and 3 are energized by four-line buffers 116 and 117, respectively. These buffers accept signals representative of the second and third most heavily weighted binary bits, respectively, representative of the different decimal digits.

The data input windings of row 4 are energized through a five-line buffer 118 which accepts signals representative of the sign and the lowest weighted binary bit representative of the different decimal digits.

It will be recalled from the discussion of FIG. 1, that only one word is inserted into storage at a time. Thus, at any one instant of time not more than one input line of each buffer is activated. When a buffer input line is made negative, signifying the presence of a weighted bit in the word then being stored, current flows through all the input windings 107 of that row to set each column 1 core in that row into the One state. It will be recalled that an amplified shift pulse from the associated amplifier 53 precedes the insertion of data into a portion of the storage register 28 so that the column 1 in each portion selected for accepting data then stores the first input word. The shift pulse preceding the timing pulse T1 shifts the data in column 1 into column 2 and clears column 1 to accept the second word for storage. This sequence is repeated until after the shift pulse which precedes the timing pulse T5, the digital number is stored in columns 2–5.

In the channel portions of storage register 28, the least significant digit and sign resides in rows 1 and 4, respectively, of column 5; and the units, tens and hundredths decimal digits, in columns 4, 3 and 2, respectively. In the frame count portion, the unit tens, hundredths and thousandths decimal digits are then stored in columns 5, 4, 3 and 2, respectively. At the conclusion of a digitalizing cycle in which all the channels are converted shift pulses may be applied to terminal 55, causing the data then in all the cores to be shifted out in sequence on output terminals 12. The data signals on output terminal 12 may be transferred to the internal storage of a digital computer or transferred to magnetic tape or cards by suitable well-known techniques.

Referring to FIG. 4, there is shown a schematic circuit diagram of a preferred embodiment of the multiar comparator 14. When the decoded analog signal on terminal 22 assumes a potential just below that of the held input analog signal on terminal 121, a signal is provided on terminal 122 for setting the associated channel comparison flip-flop 15.

This circuit is seen to comprise tubes V1 and V2 and associated circuitry. An inductor 123 and capacitor 124 are connected in series between the cathode of tube V1 and negative terminal 120. A resistor 125 provides a D.-C. return to ground for the grid of tube V1. A second inductor 126, inductively coupled to inductor 123, a diode D1 and a coupling capacitor 127 are connected in series between terminal 22 and the grid of tube V1. A diode D2 shunted by resistor 131 is connected between terminal 121 and the junction of diode D1 and capacitor 127. A plate load resistor 132 is connected between the plate of tube V1 and positive terminal 133.

The plate of tube V1 is coupled to the grid of tube V2 by the resistance-capacitance coupling network 134. The plate of tube V2 is connected to positive terminal 133. The cathode of tube V2 is connected to the junction of inductor 123 and capacitor 124. A cathode resistor 135 is connected between the cathode of tube V2 and negative terminal 120.

The grid of tube V2 is returned to terminal 120 through resistor 136. Carry pulses are coupled through diode D3 from terminal 31 to the grid of tube V2.

Operation is as follows. Initially tubes V1 and V2 are conductive and nonconductive, respectively. Since the decoded analog voltage is at its highest value at the beginning of a conversion cycle, the potential on terminal 22 normally exceeds that of the held input analog signal applied on terminal 121 and diodes D1 and D2 are nonconductive. The decoded analog potential is stepped downward during the course of a conversion cycle until substantially equal to that on terminal 121. Diodes D1 and D2 then conduct causing current to flow through inductor 126 and reducing the potential on the grid of tube V1. This reduces the plate current flowing through inductor 123. Inductors 123 and 126 are relatively oriented as indicated by the dots so that the reduction of plate current induces a potential across inductor 126 tending to drive the grid of tube V1 still more negative. This regenerative action rapidly cuts tube V1 off, causing its plate potential to rise.

The rise in plate potential of tube V1 is coupled by network 134 to the grid of tube V2 to render this tube conductive. With tube V2 conducting, the potential between grid and cathode of tube V1 is sufficient to maintain the latter tube cut off for the remainder of the conversion cycle. At the end of the conversion cycle, a carry pulse applied to the grid of tube V2 renders this tube nonconductive, allowing tube V1 to return into conduction. The rise in potential on the plate of tube V1 upon being cut off is differentiated and utilized to set the associated comparison flip-flop 15.

Tube V2 and associated circuitry performs an important function in preventing tube V1 from functioning as a blocking oscillator. Such operation would result in additional undesired settings of comparison flip-flop 15 during the remainder of the conversion cycle. With the circuit shown in FIG. 4, only one setting pulse is delivered for each conversion cycle. This circuit cooperates with comparison flip-flop 15 to enable a compare potential to be delivered by the latter only once per conversion cycle. If a comparison flip-flop 15 were not included, only a short pulse derived by differentiating the potential waveform on terminal 122 would be available for enabling the different gates. The waveform itself could not be used because it would indicate a comparison for the remainder of the conversion cycle. Thus, each comparison flip-flop in cooperation with the circuit of FIG. 4 provides a single unambiguous comparison indication during each conversion cycle of the desired duration and amplitude to condition the logical circuitry to effect the appropriate transfer of data signals into storage.

There has been described a system for substantially simultaneously sampling and converting a number of input analog signals into digital form with great accuracy and at relatively high speed while minimizing the number of precision components required. While a number of specific components have been described in detail, this is only for illustrative purposes. It is apparent that those skilled in the art may now make numerous modifications of and departures from the specific apparatus described herein without departing from the inventive concepts. Consequently, the invention is to be construed as limited only by the spirit and scope of the appended claims.

What is claimed is:

1. Analog to digital conversion apparatus comprising, a plurality of input channels each adapted to receive a separate input analog signal, means for providing an electrical indication of a digital number whose value normally changes periodically by increments corresponding to the smallest change in its least significant digit, means responsive to said electrical indications for providing a decoded analog signal characteristic of the value of said digital number, means for simultaneously comparing said decoded analog signal with said input analog signals to provide a compare signal identifying those channels having an input analog signal then differing from said decoded analog signal by less than a predetermined magnitude, said predetermined magnitude being less than or equal to the change in said decoded analog signal corresponding to a single one of said increments, storage means having portions therein corresponding respectively to each of said input channels, means responsive to said compare signal for temporarily preventing changes in the value of said digital number, means responsive to said compare signal and said electrical indication for storing the value of said digital number then indicated in said portions associated with respective input channels then identified by said compare signal, means for causing the value of said digital number to resume said normal periodic changes after storing said number, means responsive to said digital number reaching the end of a sequence of said changes whereby all said input analog signals have been converted into digital form and stored in said storage means for converting said stored digital numbers into electrical output signals in digital form, said electrical output signals in digital form being provided in sequence on parallel output lines, a frame counter for storing a frame number in digital form to identify each of said sequence of changes, and means responsive to said digital number reaching said end of said squence for transferring said frame number in digital form to said storage means.

2. Analog to digital conversion apparatus comprising, a plurality of input channels each adapted to receive a separate input analog signal, a counter providing an electrical indication of the count therein, means responsive to said electrical indication for providing a decoded analog signal characteristic of the value of said count, a source of counting pulses, means for coupling said counting pulses to said counter, each applied pulse advancing by one said count therein, means for simultaneously coupling said decoded analog signal to said plurality of channels, a comparator in each channel for comparing a respective input signal with said decoded analog signal and providing a compare signal when the difference therebetween is less than a predetermined magnitude, said predetermined magnitude being less than or equal to the change in said decoded analog signal caused by said count advancing by one, means responsive to said compare signal for temporarily decoupling said counting pulses from said counter whereby said count remains temporarily unchanged, storage means having portions therein corresponding respectively to each of said input channels, means responsive to said compare signal and said electrical indication for storing in digital form said temporarily unchanged count in those portions of said storage means associated with input channels having comparators then providing a compare signal, means for again coupling said counting pulses to said counter after storing said temporarily unchanged count, said counter providing a carry pulse after changing from a predetermined count, and means responsive said carry pulse for converting said stored terporarily unchanged counts into characteristic electrical output signals in digital form.

3. Apparatus in accordance with claim 2 wherein said electrical output signals in digital form are provided in sequence on parallel output lines.

4. Apparatus in accordance with claim 2 and further comprising, a frame counter for storing a frame number in digital form identifying a cycle occurring between successive carry pulses in which each of said input analog signals is converted into a stored digital number, and means responsive to said carry pulse for storing the frame number then in said frame counter in an associated portion of said storage means and then advancing said frame counter by one.

5. Apparatus in accordance with claim 2 wherein said comparator comprises a comparison flip-flop, first and second signal amplifying devices respectively conductive and nonconductive initially, means responsive to amplitude coincidence of said input analog and said decoded analog signals for reversing the conductive states of said first and second devices, means responsive to said reversal of conductive states for setting said comparison flip-flop to provide said compare signal, coduction of said second device maintaining said first device nonconductive, and means responsive to said carry pulse for returning said first and second devices to said initial conducting states.

6. Analog to digital conversion apparatus comprising, a plurality of input channels each adapted to receive a separate input analog signal, a counter providing an electrical indication of the count therein, means responsive to said electrical indication for providing a decoded analog signal characteristic of the value of said count, a source of counting pulses, means for coupling said counting pulses to said counter, each applied pulse advancing by one said count therein, means for simultaneously coupling said decoded analog signal to said plurality of channels, a comparator in each channel for comparing a respective input signal with said decoded analog signal and providing a compare signal when the difference therebetween is less than a predetermined magnitude, said predetermined magnitude being less than or equal to the change in said decoded analog signal caused by said count advancing by one, means responsive to said compare signal for temporarily decoupling said counting pulses from said counter whereby said count remains temporarily unchanged, storage means having portions therein corresponding respectively to each of said input channels, means responsive to said compare signal and said electrical indication for storing in digital form said temporarily unchanged count in those portions of said storage means associated with input channels having comparators then providing a compare signal, and means for offsetting said decoded analog signal during time intervals when said count is temporarily unchanged to prevent a false compare signal from then being generated.

7. Apparatus in accordance with claim 6 and further comprising means for holding all said input analog signals to respective levels determined at the same instant of time, said levels being converted into digital form and stored.

References Cited in the file of this patent

UNITED STATES PATENTS

| | | |
|---|---|---|
| 2,568,724 | Earp et al. | Sept. 25, 1951 |
| 2,753,546 | Knowles | July 3, 1956 |
| 2,828,482 | Schumann | Mar. 25, 1958 |